Aug. 11, 1959  C. B. LEACH ET AL  2,899,015
ENGINE BEARINGS AND LUBRICATION SYSTEM
Filed Dec. 13, 1956  2 Sheets-Sheet 1
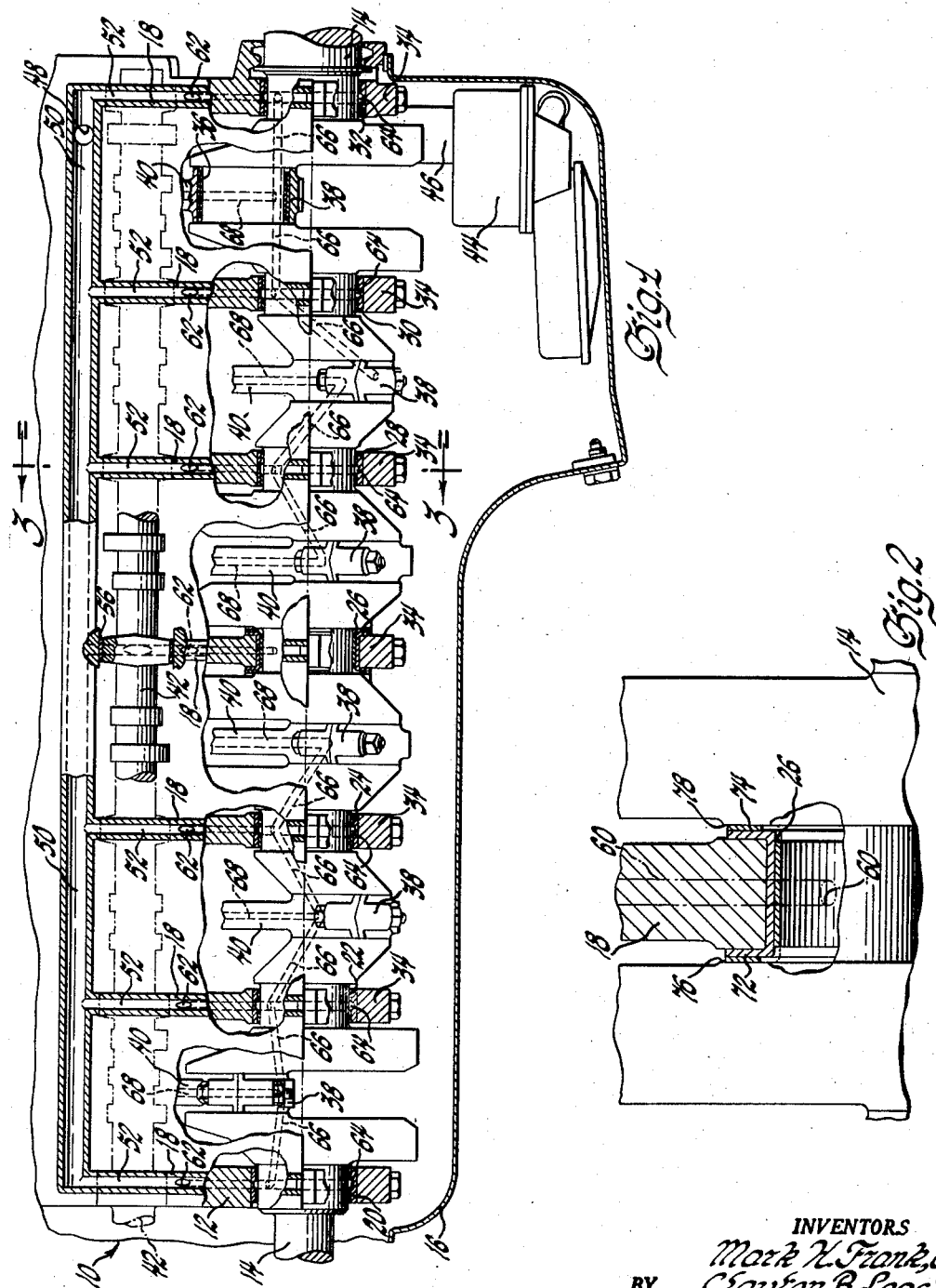
INVENTORS
Mark N. Frank, &
BY  Clayton B. Leach
L. D. Burch
ATTORNEY

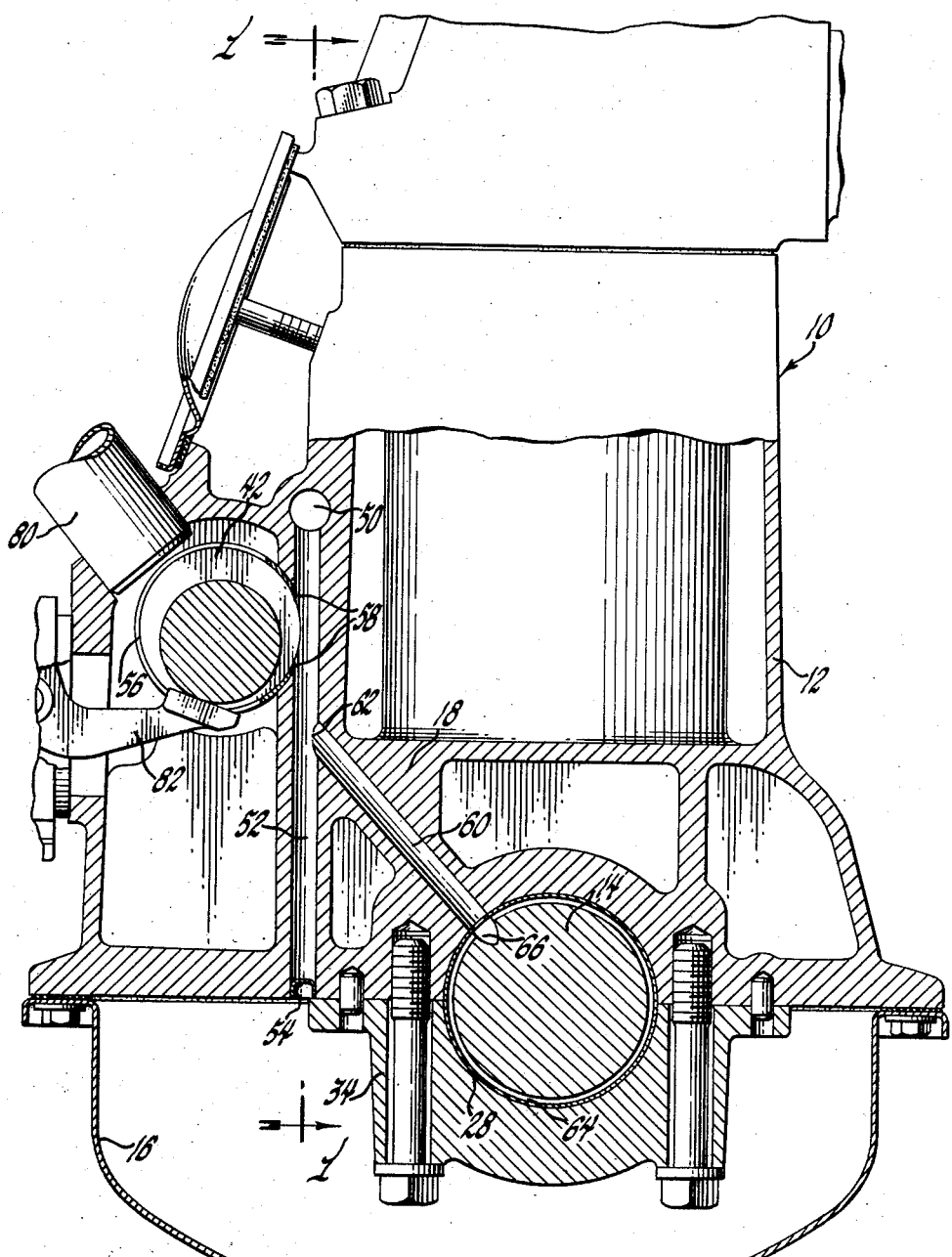

United States Patent Office 2,899,015
Patented Aug. 11, 1959

2,899,015

ENGINE BEARINGS AND LUBRICATION SYSTEM

Clayton B. Leach, Pontiac, and Mark H. Frank, Birmingham, Mich., assignors to General Motors Corporation, Detroit, Mich., a corporation of Delaware Application December 13, 1956, Serial No. 628,093

2 Claims. (Cl. 184—6)

The invention relates to an internal combustion engine having main bearings, the center one of which is associated with the crankshaft thrust bearing surfaces, and the lubrication of the engine main bearings, the camshaft bearings, the crankpin bearings and the wristpins.

Many internal combustion engines have been designed to have seven main bearings. These engines have been made longer than otherwise necessary in order to provide room for a longer center bearing since the center main bearing in this type engine carries the highest load impressed on any main bearing in the engine. This high load is present because the dynamic loads from both the reciprocal and rotating parts of both adjacent cylinders are in phase, that is, the number three crankpin and number four crankpin, which are to the front and rear of the center bearing respectively, are both in the same angular position on the crankshaft. Although the gas loads naturally have a different phase relationship, the inertia loads of the respective parts and any uncounterbalanced portion of the centrifugal loads from the rotating parts combine to produce these loadings. One feature of the invention permits a center main bearing to be used which is no longer than the other main bearings while providing efficient lubrication to the crankpin and wristpin bearings. This is accomplished by obviating the necessity of the conventional center oil supply groove in the center main bearing. The use of an ungrooved center main bearing results in a three-fold benefit. The length of the bearing surface contacting the crankshaft is longer, by the width of the eliminated groove, than the other main bearings since no groove is present. Furthermore, the load carrying capacity of an ungrooved bearing rises rapidly because of the uninterrupted length of oil film present. The load carrying capacity of any bearing varies approximately as the square of the uninterrupted length of oil film between the bearing and the journal. If the contacting surface of the bearing is broken by a groove, the capacity then becomes proportional to only the sum of the squares to the two lengths on either side of the groove. The additional load carrying capacity presented by an ungrooved bearing is thus utilized. Since all main bearings may be of equal length, equal bore spacing may be maintained, resulting in an overall decrease in engine length.

Another feature of the invention is a simplified lubrication system which requires the use of no external pipes or fittings. All of the oil passages to the various lubricating points within the engine are drilled or otherwise formed within various mechanical elements of the engine.

In the drawings:

Figure 1 is a partial view of an internal combustion engine embracing the invention taken in the direction of arrows 1—1 of Figure 3 and having parts broken away and in section.

Figure 2 is an enlarged view of the number four main bearing of the engine shown in Figure 1.

Figure 3 is a view taken in the direction of arrows 3—3 of Figure 1 with parts broken away and in section.

While the invention is applicable to other types of engines, it is especially adapted to a seven main bearing engine and such an engine is used for purposes of illustration. The internal combustion engine 10 includes an engine block 12, a crankshaft 14 and an oil pan 16 which protects the bottom of the engine and retains the engine lubricating oil supply. Bulkheads 18 are integrally cast in the engine block and provide supports for the engine main bearings which may include the number one, two and three main bearings 20, 22 and 24, respectively, the center or number four main bearing 26 and numbers five, six, seven main bearings 28, 30 and 32, respectively. Main bearing caps 34 are provided for each of the bearings and may be suitably positioned and secured to the respective bulkheads. Crankpin bearings 36 are provided in the usual positions on the crankshaft throws and crankpin bearing caps 38 hold piston rods 40 in place around bearings 36. Camshaft 42 is supported in an upper portion of bulkheads 18.

The engine lubrication system includes a positive displacement oil pump 44 which is submerged in lubricating oil contained in oil pan 16. The oil is pressure regulated within the pump and delivered through a passage in pump mount 46, which may be integrally cast within the engine block, and through passage 48 to oil gallery 50. The oil gallery is drilled or otherwise formed in the engine block and extends longitudinally of the engine. Bearing supply oil passages 52 may be vertically drilled from the underside of the engine block to connect with oil gallery 50. Each of the passages 52 is drilled in one of the bulkheads 18. The lower end of passage 52 may be sealed with a dome shaped sheet metal plug 54 which is pressed into the passage. Each of the main bearing caps 34, when in position, extends over a portion of the opening of passage 52 and blocks a plug 54 in position. The plugs cannot then be blown out by pressure in the lubricating system.

Camshaft 42 may be provided with bearings 56 which are secured in the bulkheads 18. Drilled passages 52 intersect the camshaft bearings 56 tangentially at 58, providing a generally elliptical opening through the bearings 56. Lubricating oil for each of the bearings 56 is furnished through these openings from passages 52.

Each of the main bearings except the center main bearing 26 may be provided with a centrally located circumferential groove 64. Crankshaft lubricating passages 60 are drilled in bulkheads 18 from a point adjacent the location of main bearing grooves 64 to intersect drilled passages 52 at 62. The crankshaft is drilled with passages 66 to connect bearing groove 64 with the crankpin bearings 36 and passages 68, which are drilled through the piston rods and the crankpin bearings and lead to the wristpin bearings. Since the center main bearing 26 has no bearing groove, no passages comparable to the passages 66 are drilled from the area of the center main bearing journal to the adjacent crankpin bearings. All of the crankpin bearings except the two adjacent center main bearing 26 may therefore be provided with two parallel sources of lubricating oil from oil gallery 50 while the two crankpin bearings adjacent main bearing 26 are provided with a single source of lubricating oil. Should it be considered desirable, passages 66 from number two and number six main bearings and their respective grooves 64 may also be eliminated without impairing the lubrication of the crankpin bearings.

Center main bearing 26 may be provided with radially extending circumferential flanges 72 and 74 on either end which engage parallel surfaces on bulkhead 18 and are adapted to be engaged by crankshaft thrust surfaces 76 and 78. These bearing flanges are provided to take the engine thrust.

Lubricating oil may be placed in the engine by any means such as filler neck 80. A typical fuel pump arm 82 may also be driven from camshaft 42, as may other accessories such as the oil pump 44.

An internal combustion engine having engine bearings and a lubrication system providing for simplified lubrication of the camshaft bearings and continuous lubrication of the rod bearings has thus been disclosed. A simplified retaining arrangement has been shown for holding plugs in the drilled passages 52. The load carrying capacity of the center main bearing has been increased without increasing its overall length, allowing an engine having a shorter overall length to be manufactured.

What is claimed is:

1. In an internal combustion engine bearing and lubrication system, an engine block having a plurality of cylinders formed therein and support walls integrally formed therewith intermediate said cylinders and at each end of said block, engine main bearings and camshaft bearings received in said support walls, a camshaft rotatably mounted in said camshaft bearings and a crankshaft rotatably mounted in said main bearings, an oil pan secured to said block and forming a lubricating oil sump in cooperation with the underside of said block, an oil pump in said sump secured to said block for lubricating the engine, each of said cylinders having reciprocating pistons therein and piston rods connecting said pistons with said crankshaft, crankpin bearings on said crankshaft and wristpin bearings on said pistons and connecting with said rods, two adjacent of said pistons having their dynamic loads in phase and one main bearing therebetween whereby said one main bearing is subjected to higher loads than the other main bearings, said block having a longitudinally extending oil gallery formed therein and connected by an internal passage to said oil pump to receive lubricating oil therefrom under pressure, each of said support walls having first integrally formed passage means therein connecting with said oil gallery and tangentially intersecting one of said camshaft bearings to provide lubricating oil thereto and terminating adjacent said sump, second passage means in each of said support walls intersecting said first passage means and terminating at said main bearings, said main bearings other than said one main bearing each having an annular groove formed therein connecting with said second passage means in oil flow relation, said one main bearing being substantially the same length as said other main bearings but having a single continuous bearing surface whereby the higher dynamic loads may be carried by said one main bearing, said crankshaft having passages therein connecting said main bearing grooves with said crankpin bearings, and passages formed in said crankpin bearings and said piston rods in flow relation with said crankshaft passages for lubricating said wristpin bearings.

2. The system of claim 1, said one main bearing being the center main bearing of a seven main bearing engine and formed to transmit the crankshaft thrust to said engine block.

References Cited in the file of this patent

UNITED STATES PATENTS

| | | |
|---|---|---|
| Re. 24,065 | Bergstrom | Oct. 4, 1955 |
| 1,878,379 | Church | Sept. 20, 1932 |
| 1,948,340 | Dolza | Feb. 20, 1934 |
| 1,969,690 | Church | Aug. 7, 1934 |
| 2,049,678 | Ware | Aug. 4, 1936 |
| 2,304,255 | Huber | Dec. 8, 1942 |
| 2,586,379 | Postma | Feb. 19, 1952 |
| 2,681,054 | Boghossian | June 15, 1954 |

FOREIGN PATENTS

| | | |
|---|---|---|
| 26,728 of 1906 | Great Britain | Nov. 23, 1907 |
| 548,176 | Great Britain | Sept. 29, 1942 |